Nov. 4, 1941.  E. B. NICKLES  2,261,483
LOAD HANDLING DEVICE
Filed Dec. 5, 1938  8 Sheets-Sheet 3

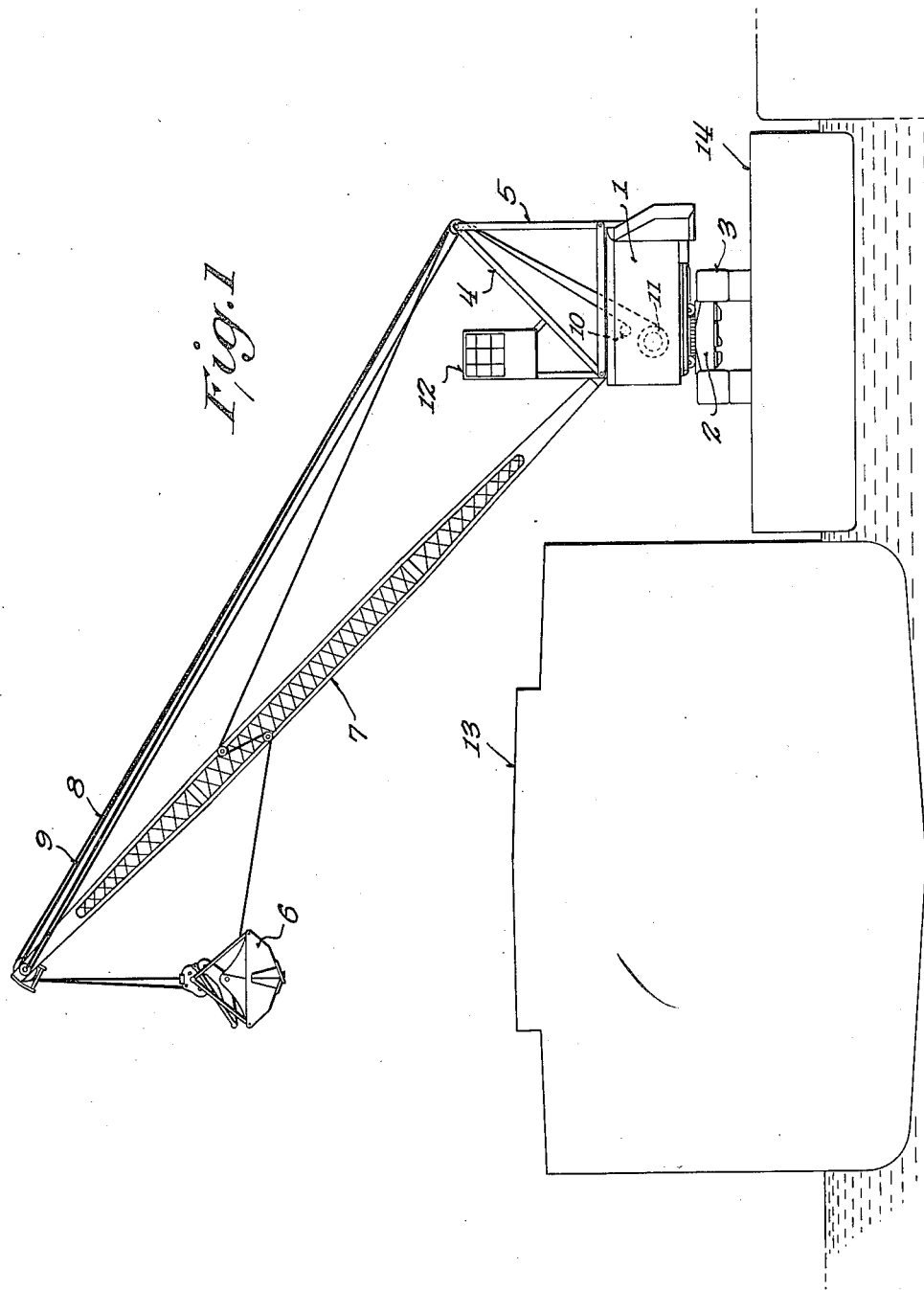

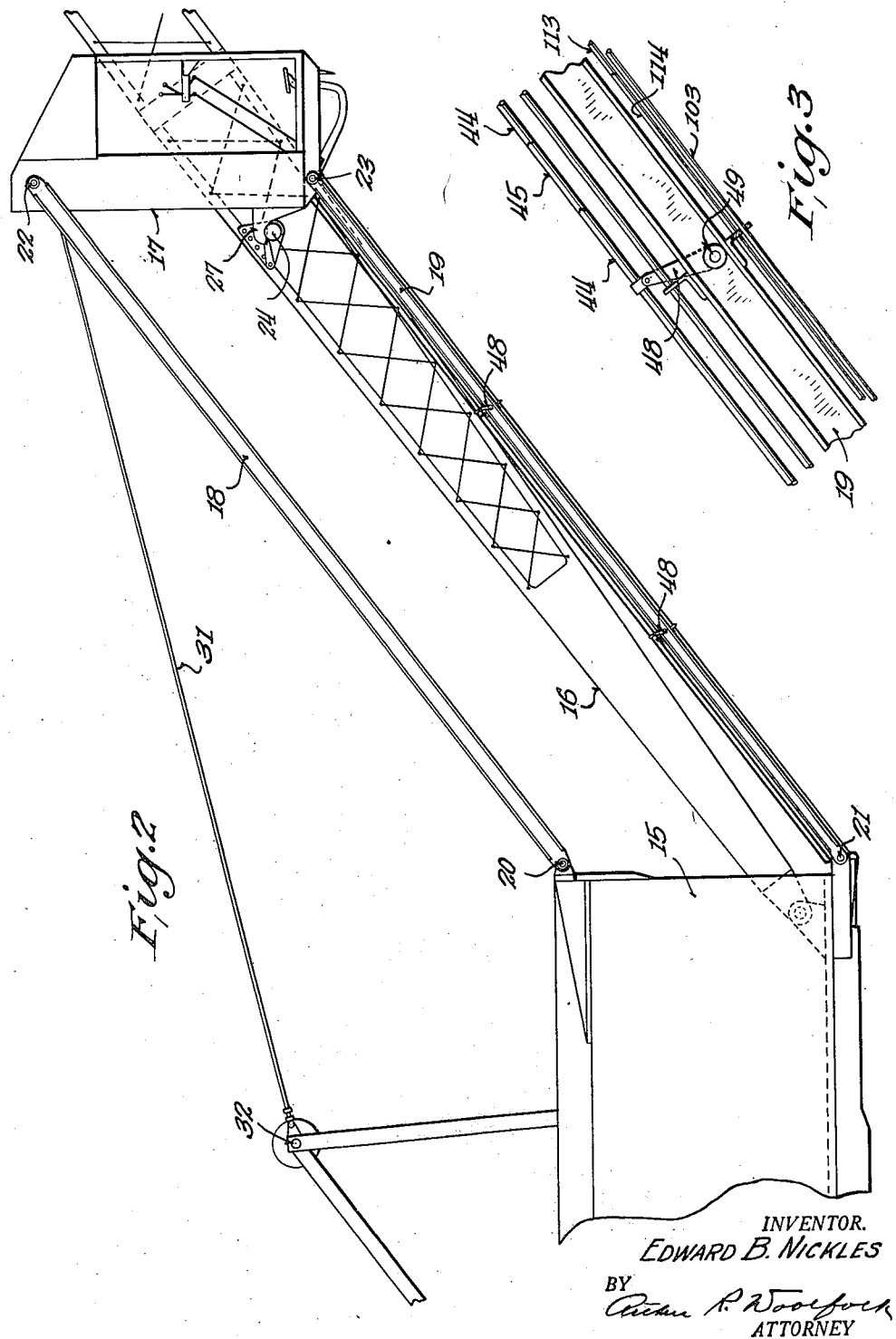

INVENTOR.
EDWARD B. NICKLES
BY
ATTORNEY

Nov. 4, 1941.   E. B. NICKLES   2,261,483
LOAD HANDLING DEVICE
Filed Dec. 5, 1938   8 Sheets-Sheet 4
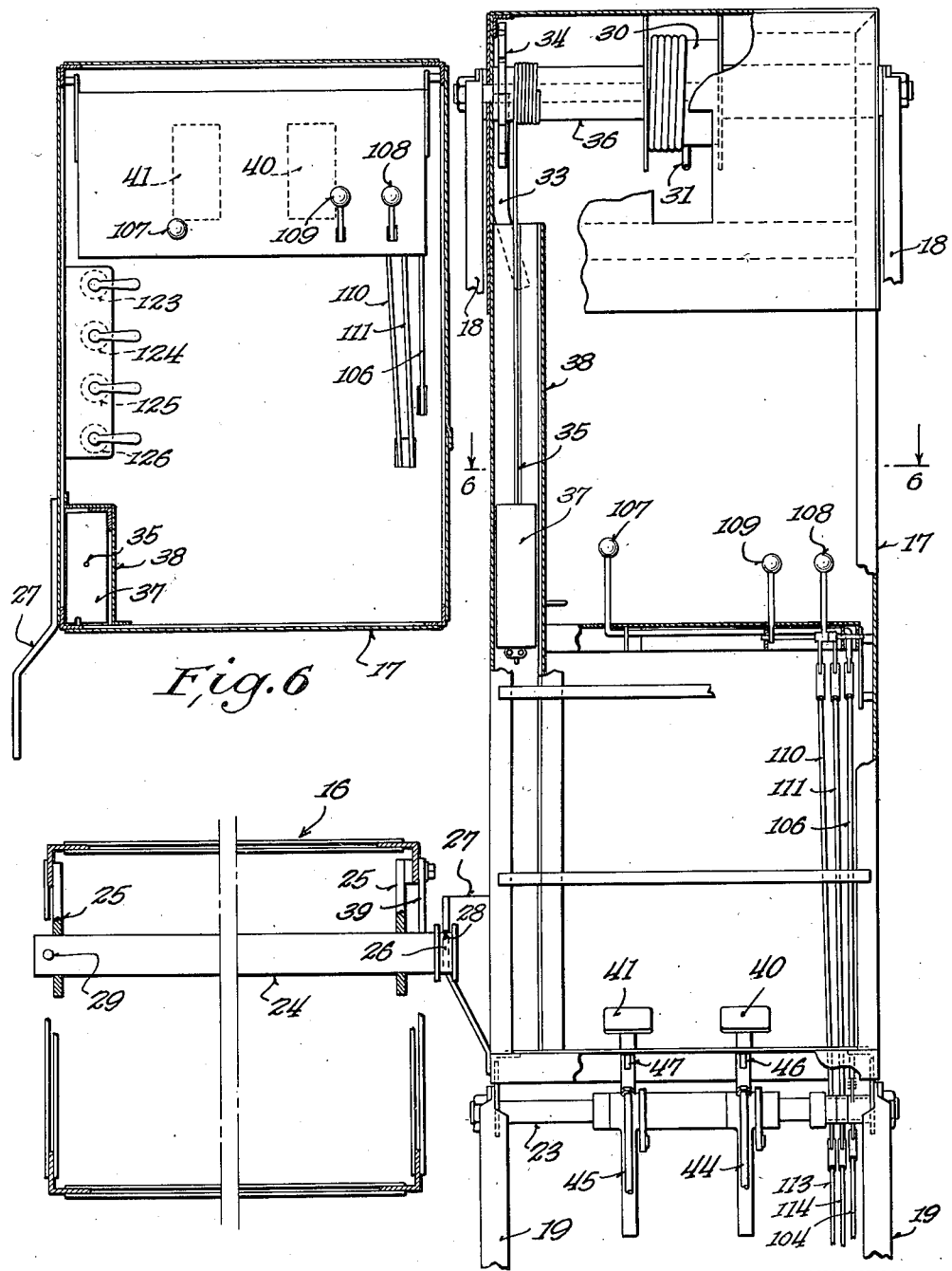
INVENTOR.
EDWARD B. NICKLES
BY
Arthur R. Woolfock
ATTORNEY

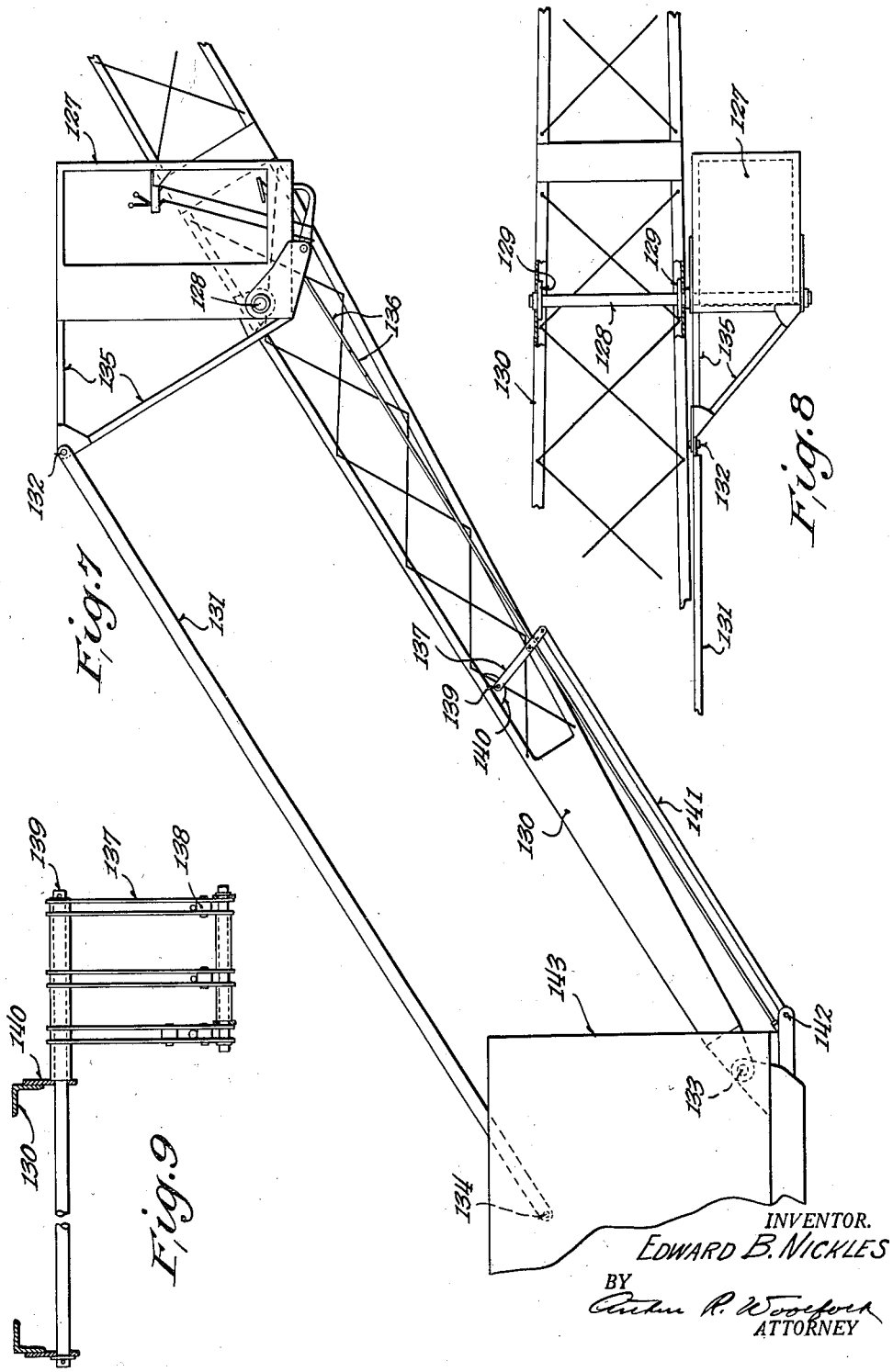

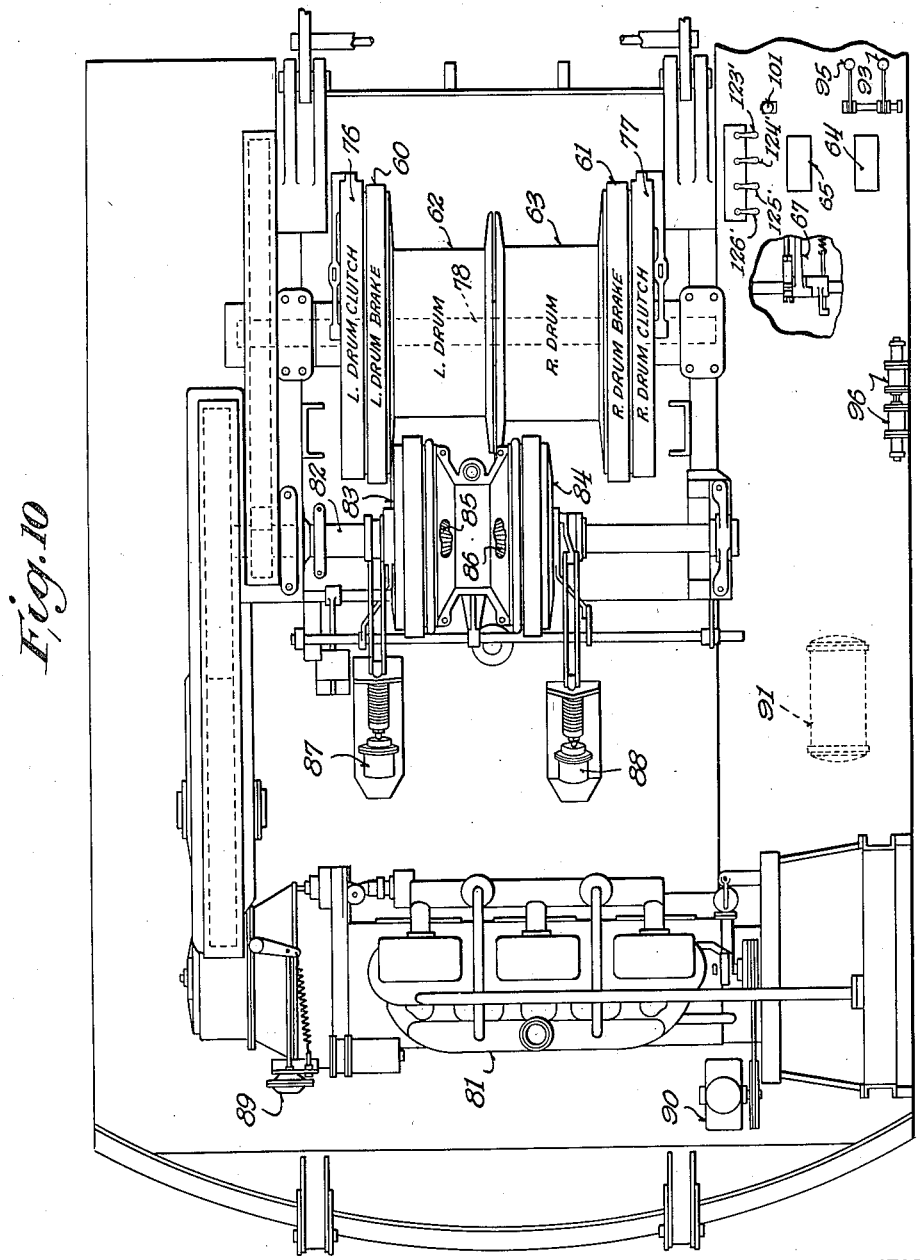

Nov. 4, 1941.   E. B. NICKLES   2,261,483
LOAD HANDLING DEVICE
Filed Dec. 5, 1938   8 Sheets-Sheet 7
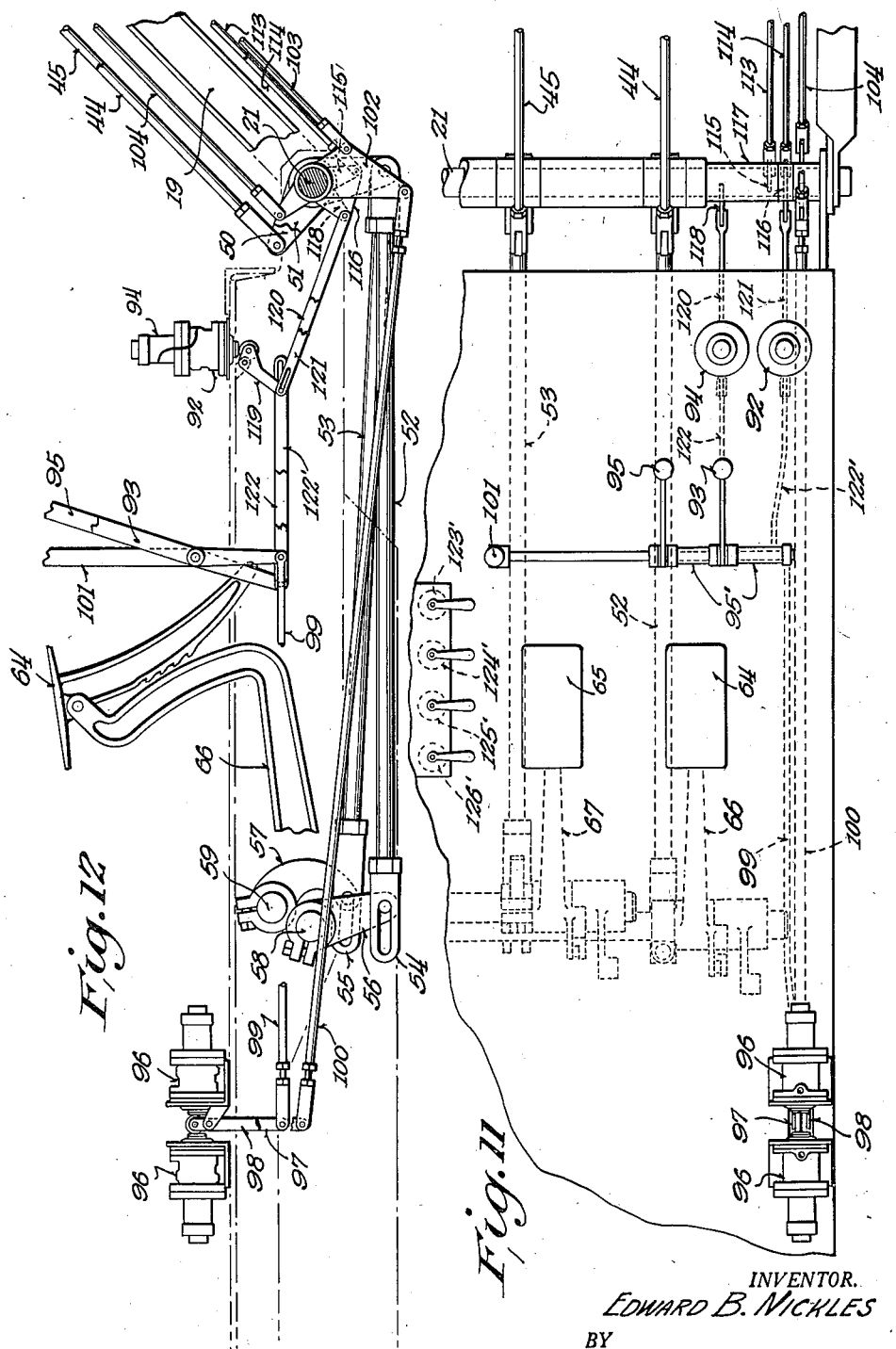
INVENTOR.
EDWARD B. NICKLES
BY
   ATTORNEY

INVENTOR.
EDWARD B. NICKLES
BY
ATTORNEY

Patented Nov. 4, 1941

2,261,483

UNITED STATES PATENT OFFICE 2,261,483

LOAD HANDLING DEVICE

Edward B. Nickles, Manitowoc, Wis., assignor to Manitowoc Shipbuilding Company, Manitowoc, Wis.

Application December 5, 1938, Serial No. 243,949

17 Claims. (Cl. 212—58)

This invention relates to load handling devices, such as cranes, shovels, draglines, trenchoes, or similar machines.

An object of this invention is to provide a load handling device where the operator is located at a position above the work so that he can get a clear view of the field of operations.

Further objects are to provide an elevated control cab with control means for controlling the crane or other load handling device directly from the control cab, and to provide certain of the controls, particularly the brake operating means, with mechanical intermediate connecting means so that the brake operating means in the elevated control cab directly controls the brakes, thereby allowing the operator to get the "feel" of the brakes in the usual manner though he is located in the elevated cab, the invention however in its broadest aspect contemplating any type of control between the remote cab and the main mechanism.

In certain forms of the invention the control cab is vertically adjustable to different heights and may be adjusted preferably by power means so that the operator may set the elevated cab at the desired height and may operate the load handling machine, such as the crane for instance, from that height, thereby allowing him to adjust the control cab to the particular demands of the work.

More specifically, further objects of this invention are to provide a vertically adjustable control cab which is elevated by means of the boom, the boom itself being raised by power from the main mechanism in the usual manner, and to provide a construction in which the control cab swings with the boom, that is to say, as the boom swings horizontally back and forth, the control cab simultaneously swings horizontally back and forth. In this way the operator is enabled to correctly judge the position of the boom as the operators of cranes and the like swing with the mechanism but have heretofore been positioned in the cab in the main body of the machine.

In all forms of the invention the elevated cab swings with the machine so that the operator may sense the position of the boom, and consequently of the load handling means, with precision.

Further objects are to provide control means in the control cab which are operatively connected with the corresponding parts in the main body of the apparatus either mechanically, pneumatically, hydraulically or in any other manner, and in which the connecting means is unaffected by the raising or lowering of the control cab, the construction of the mechanical connections, where mechanical control is employed and where the cab is vertically adjustable, being such that parallelograms are formed by the operating parts which simultaneously adjust themselves with the angular adjustment of the supporting means for the control cab.

Further objects are to provide a dual control so that the crane or the like may be controlled from the remote elevated cab or, when desired, directly from the main cab or body of the device.

More specific objects of this invention are to provide a load handling device, such as a crane or the like, in which the control cab is maintained vertical in all positions of adjustment, in which where mechanical intermediate mechanism connects the controls in the control cab with the corresponding parts in the main body, the mechanical mechanism automatically adjusts itself for different heights for which the control cab is set without affecting the controls in any manner, in which the operator may raise or lower the control cab without descending from the cab and without requiring additional assistance, in which the operator may have the "feel", as heretofore developed, not only of the grip of the brakes but also of the position of the boom, as it has been found from actual tests that this greatly facilitates the ease and speed with which he can handle the device.

Embodiments of the invention are shown in the accompanying drawings, in which:

Figure 1 is an elevation showing one form of the invention.

Figure 2 is a fragmentary side view showing a second form of the invention.

Figure 3 is a fragmentary detail drawn to a larger scale than Figure 2, showing a portion of the connecting mechanism joining the control mechanism in the cab with the other mechanism in the main body.

Figure 5 is a rear view of the cab shown in Figure 4 with parts broken away and in section.

Figure 6 is a horizontal sectional view on the line 6—6 of Figure 5.

Figure 7 is a side elevation corresponding approximately to Figure 2 showing a third form of the invention.

Figure 8 is a fragmentary plan view of part of the structure shown in Figure 7.

Figure 9 is a sectional view showing the pivoted swinging rack for guiding the rods.

Figure 10 is a plan view looking down into the main cab of the crane, with parts broken away.

Figure 11 is a fragmentary plan view of a part of Figure 10 drawn to an enlarged scale.

Figure 12 is a fragmentary elevation of the structure shown in Figure 11, with parts broken away and in section.

Figure 4:
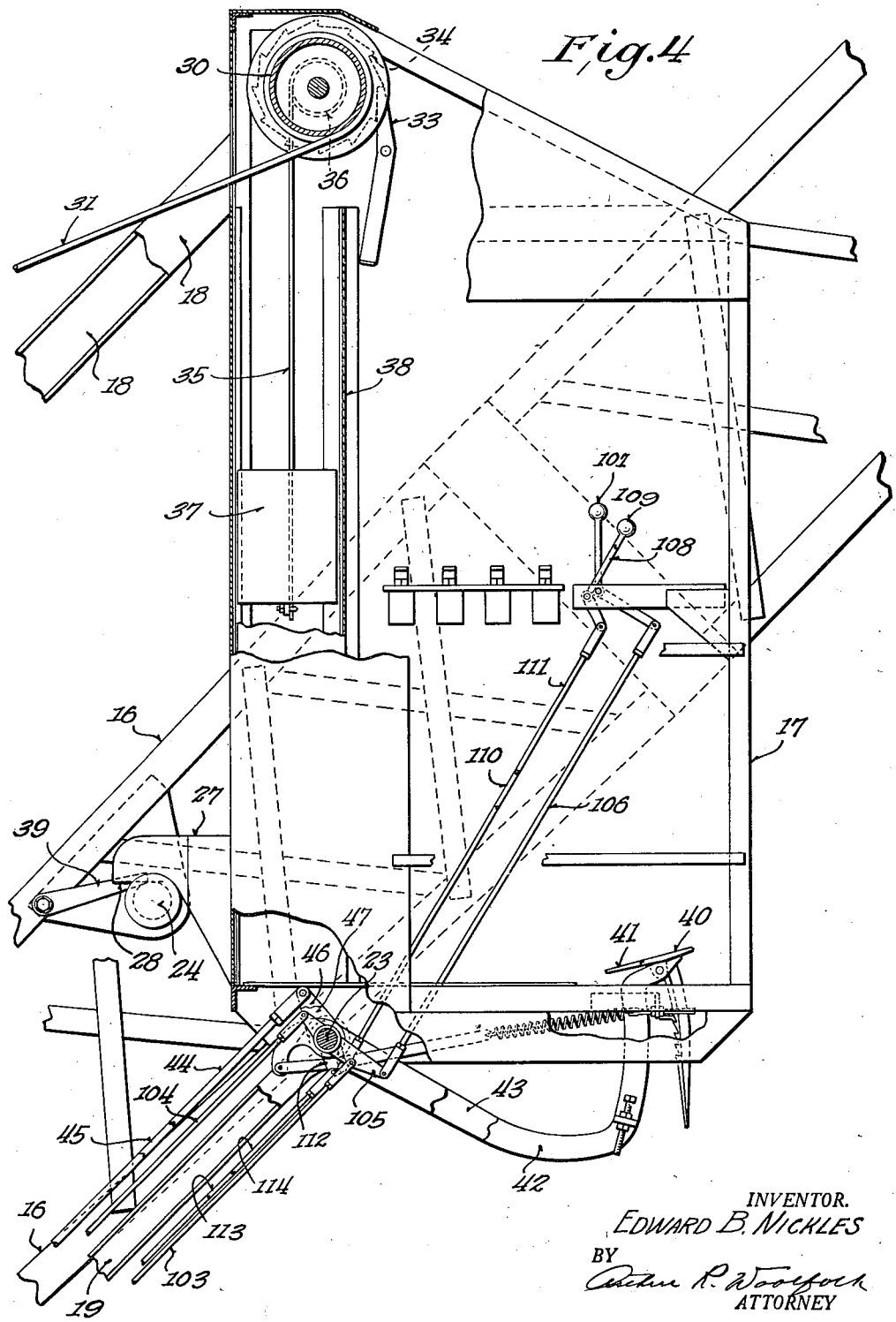
Figure 4 is a side elevation, partly broken away and with parts in section, showing the control cab and the associated parts for the form of the invention shown in Figure 2.

Referring to Figure 1 which shows one form of the invention, it will be seen that a crane has been illustrated as having a main body portion 1 which is pivoted for rotation about a vertical axis on the car body 2, which latter may be provided with crawlers 3 or any other suitable means of propulsion. The main body 1 is provided with a heavy braced structure indicated at 4 and 5 which carries the sheaves for the cables for operating the load handling means 6 and for elevating or lowering the boom 7, the boom being pivoted on the main body 1 as indicated. The load handling means may be of any type and the invention in its different forms includes not only a crane but any of the other types of load handling devices, such as shovels, draglines, trenchoes, or any other type of load handling device. The cables for operating the load handling device are indicated by the reference character 8 and the cable or cables for raising and lowering the boom are indicated by the reference character 9. The boom hoisting drum is indicated at 10 and the drums for operating the load handling means at 11.

It frequently happens that the operator has to handle work which is ordinarily not within his range of vision when he is mounted in the usual type of cab in the body portion 1. This invention, however, overcomes the above defect in that it provides an elevated cab 12 which, in the form shown in Figure 1, is mounted at a considerable distance above the main body 1 and is carried directly by the main body. The various controls for the crane are in this control cab 12 so that the operator may have a clear view of the work.

As shown in Figure 1 the crane is shown as loading a vessel 13 which has a relatively high body extending considerably above the float 14 on which the crane happens to be positioned.

This is a very common type of work that cranes are called upon to do and it is the usual practice to station an operator on the deck of the boat who signals to the operator in the cab, but with this invention the operator on the deck of the boat can be dispensed with and a single operator in the cab can see the work and control the crane at one and the same time.

This form of work is only chosen as an illustration of the type of work that a crane constructed in accordance with this invention is designed to do.

The invention may take other forms. For example, as shown in Figure 2, the main body of the crane is indicated at 15 and is provided with the usual pivoted boom 16 and the power mechanism and operating cables, which are not shown in this view for the sake of clearness. The boom is adapted to be raised and lowered in the usual manner. However, the control cab indicated by the reference character 17 is carried by a pair of upper and lower arms or links 18 and 19 respectively which are pivoted at 20 and 21 to the main body 15 and at 22 and 23 to the control cab. The upper and lower arms 18 and 19 are the same length and the pivot points 22 and 23 occupy the same relative position as the pivot points 20 and 21 so that a parallelogram is formed. This construction is followed so as to maintain the cab 17 in a vertical position for all positions of adjustment, the cab being designed to be vertically adjusted to different heights as will hereinafter appear.

Means are provided for raising and lowering the cab. These means may take different forms. One form of power means for raising and lowering the cab is illustrated in Figures 2, 4 and 5, and in this form the crane is provided with means for detachably operatively connecting the boom and the cab so that the cab may be lifted by the boom to the desired position and may then be detached therefrom, suitable means hereinafter described being provided for holding the cab in its elevated position independently of the boom. Thereafter the boom may be raised or lowered independently of the cab but inasmuch as the cab is supported from the main body 15, the cab will swing back and forth with the boom, thus giving the operator the correct "feel" or sense of position for different positions that the boom may swing to. The elevated position of the cab allows the operator to have a clear and unobstructed view of the work and if the work necessitates a higher or a lower position, this is readily accomplished by again attaching the cab to the boom and allowing the boom to raise or lower the cab as needed until the cab arrives at the desired position.

The operative connecting of the boom and cab may be very easily accomplished by providing a relatively heavy pin or rod 24, see Figure 5, which is slidably carried by brackets 25 secured to the boom and which is provided with a grooved or flanged portion 26 on its outer end next to the cab. The cab is provided with a relatively heavy bracket 27 which is adapted to be engaged by the pin 24, the bracket 27 preferably having a horizontal portion 28 which is adapted to fit between the flanges of the part 26 of the pin 24, as shown in Figures 4 and 5, a stop pin 29, see Figure 5, being provided to limit the motion of the pin outwardly towards the cab.

After the cab has been raised to the desired position, it is contemplated holding the cab independently of the boom in this form of the invention. This is readily accomplished by providing a winding drum 30 in the cab, for example in the upper rear portion thereof as shown in Figure 4, and providing a cable 31 which winds on the drum 30 as the cab is raised, the cable being attached to the drum at one end and at its other end being attached to a fixed point of support 32 carried by the main body 15, see Figure 2. A pawl 33 cooperates with the ratchet teeth 34 rigid with the drum to lock the drum in any desired position.

In order to take up the slack of the cable 31 as the cab is lifted, means are provided for winding the cable 31 on the drum 30. For example, a cable 35, see Figure 4, may be wound on a smaller drum 36 rigid with the drum 30, see Figures 4 and 5, the cable being attached at one end to the drum 36 and the other end to a weight 37 slidably guided in one corner of the cab as by means of guides 38 for instance.

Thus when the boom and cab are connected, and the boom is raised, the cab is simultaneously raised. Thereafter the boom may be slightly lowered and the cab will remain in its elevated position due to the fact that it is held in such position by the cable 31. The operator then slides the pin 24 inwardly towards the boom away from the cab, see Figure 5, raising the pawl 39 and thereafter allowing the pawl to drop into the portion 26 to prevent the pin 24 from again sliding outwardly until deliberately detached from the pawl 39 by the operator. The boom may now be raised or lowered independently of the cab but when the boom is swung by turning the main body portion 15, see Figure 2, it is clear that the cab will swing horizontally with the boom.

If it is desired to elevate the cab to a still greater height, the operator obviously may again go through the same operations hereinbefore described, that is to say, he may cause the boom to approach from below the bracket 27 and when immediately below the bracket may detach the pawl 39, see Figure 5, and slide the pin 24 outwardly beneath the bracket. Thereafter when the boom is raised, the pin 24 will engage the bracket and raise the cab. If he desires to lower the cab, the operator goes through the same operations to the point where the cab is being lifted by the boom. Thereafter he detaches the pawl 33, see Figures 4 and 5, and causes the boom to descend, thus lowering the cab. When the desired position is reached, he releases the pawl 33 and allows the boom to continue downwardly a slight distance to move the pin 24 out of contact with the bracket 27. Thereafter he slides the pin backwardly towards the boom and locks it in place by means of the pawl 39.

In cranes and other load handling devices it is the usual practice to provide a pair of drums, as will hereinafter be described, for controlling the load handling means. These drums are controlled by brakes in the usual manner and it is desirable, though the operator is located at a remote point, to provide means for directly mechanically controlling the brakes, for the operator has to have the "feel" of the brakes. He does not have this "feel" of brakes if there is no mechanical connection between the brake pedals, for instance, in his cab and the brakes. In this invention, however, the means for operating the brakes which are carried in the cab are directly mechanically connected to the brakes so that the pressure of the operator's foot on either or both brake pedals is directly transmitted mechanically to the brakes though the operator is located at the remote point. It is obvious that the brakes could also be operated either pneumatically or hydraulically from the elevated cab.

Referring to Figures 4, 5 and 6, it will be seen that a pair of brake pedals 40 and 41 have been provided. The brake pedal 40 controls the left drum and the brake pedal 41 controls the right drum. The brake pedals are respectively pivoted on the levers 42 and 43, see Figure 4, and these levers are connected to the rods 44 and 45. The brake levers 42 and 43 are connected to the rods 44 and 45 by means of the short levers 46 and 47 which are rigid with the respective brake levers 42 and 43. Suitable spring means, as shown, are provided for retracting the brake pedals, see Figure 4, and also the usual locking arrangement for each pedal is provided in accordance with the conventional practice.

The rods 44 and 45 extend downwardly paralleling the arms or links 19, as shown most clearly in Figure 3. If desired, at intervals along the arms or links 19 supporting pivot levers 48 are provided and are carried by rods 49 provided with spacers and extending between the arms 19. These levers 48 are of the same length and arranged in the same angular relation as the levers 46 and 47 so that a parallelogram construction is obtained. The lower ends of the arms 44 and 45 are joined to levers 50 and 51, see Figure 12, which levers pivot about the pivot pin 21. The levers 50 and 51 also are arranged in the same angular relation as the levers 46 and 47, that is to say, the levers 50 and 51 parallel the levers 46 and 47. In the position shown in Figure 4, however, the brake pedals have been shown depressed, whereas the position of the parts shown in Figure 12 is for an elevated position of the brake pedals.

The levers 50 and 51 are provided with downwardly projecting extensions which are pivoted to the outer ends of rods 52 and 53 which operate the brake mechanism. The inner ends of the rods 52 and 53 are provided with slotted portions 54 and 55 which receive pins carried by levers 56 and 57 rigidly secured to the shafts 58 and 59 that control the brakes 60 and 61 for the left and right drum 62 and 63 respectively, see Figure 10, such drums controlling the operation of the load handling means in the conventional manner.

In the cab of the main body a duplicate set of controls are provided. As shown in Figure 11 for instance, the left drum brake pedal 64 and the right drum brake pedal 65 are provided and control respectively the left drum brake and the right drum brake. These pedals, however, are not depressed when the pedals 40 or 41, see Figure 4, are depressed, but when the pedals 64 or 65 are depressed, they operate the brake control rock shafts 58 and 59, as will hereinafter appear.

Referring to Figure 12, it is to be noted that only one brake pedal 64 has been shown for the sake of clearness. This brake pedal is carried by a lever 66, also shown in dotted lines in Figure 11, and the brake pedal 65 is carried by the brake lever 67, as shown in dotted lines in Figure 11 and as shown in full lines in Figure 14. Certain of the parts have been omitted in Figure 12 and shown in dotted lines in Figure 11. One set of parts have been shown in full lines in Figure 14, for instance that set for the pedal 65 for the right drum brake.

Figure 14:
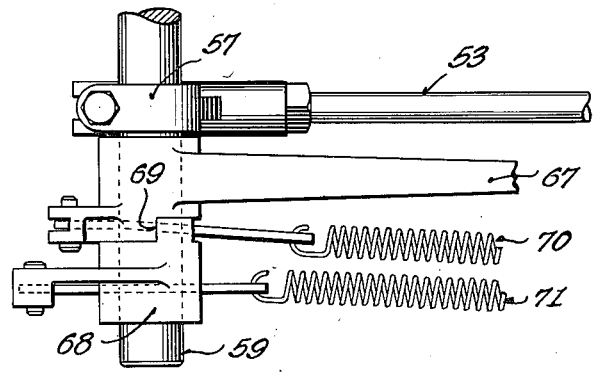
Figure 14 is a fragmentary plan view of part of the brake pedal structure shown in Figure 11.

Referring to Figure 14, the lever 67 is loosely mounted on the brake rock shaft 59. A small hub 68 is rigidly secured on the shaft 59 and similarly the lever 57, see Figures 12 and 14, is rigidly secured to the shaft 59. The lever 67 and the hub portion 68 are provided with interengaging shoulder portions 69. The purpose of this construction is so that when the lever 67 is depressed by its brake pedal, the shouldered portions 69 engage and the shaft 59 is rocked, thus applying the brake. Similarly when the rod 53 is moved to the left as viewed in Figure 14, see also Figures 12 and 4, by the depression of the brake pedal 41 in the cab 17, the shaft 59 is rocked and the brake is applied. It is to be noted, however, that the lever 67 is not depressed when the rod 53 is moved for the shouldered portions 69 disengage or move away from each other and the spring 70 retains the lever 67 in its normal position. A spring 71 is provided for rocking the shaft 59 to brake releasing position. A similar construction is provided for each of the brake pedals.

This construction, therefore, provides a dual control—one in the main cab and one in the elevated cab—so that the operator can control the operation of the crane from either point. Further it will be seen that due to the parallelogram arrangement of control rods hereinbefore described, that the vertically adjustable cab 17 can be raised or lowered to any desired position without affecting the operative connection between the brake pedals within the cab 17 and the brake mechanism in the main body.

Figure 13:
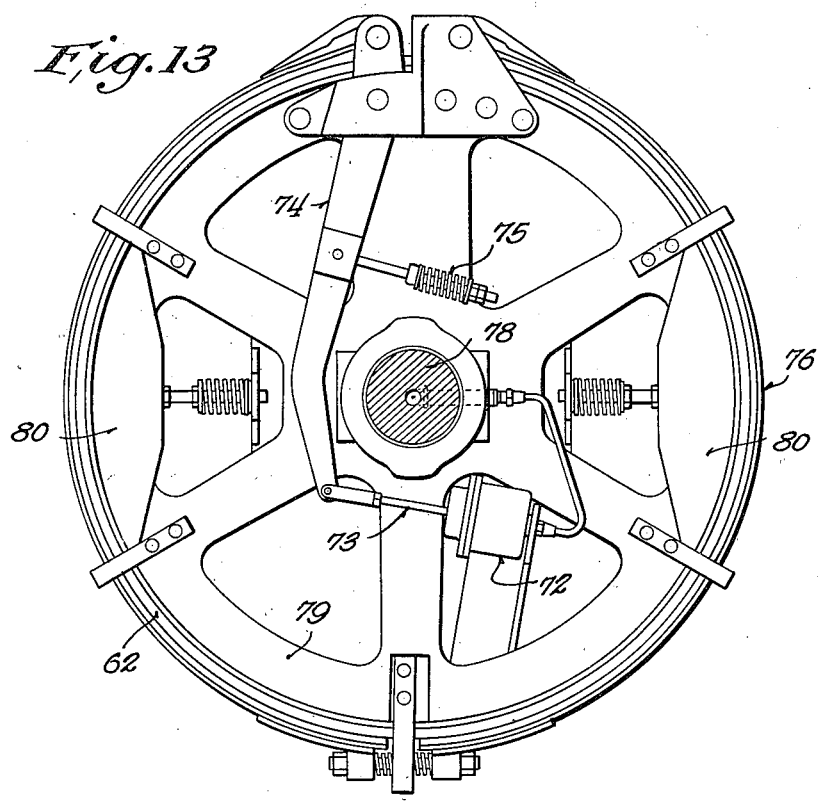
Figure 13 is an end view of one of the drum clutches and the associated parts.

Various other controls are provided in duplicate in the vertically adjustable remote cab 17 and in the cab in the main body. These controls may be of the same kind as that disclosed in the companion application Serial No. 196,246 in which I am a joint inventor with John D. West for a Remotely Controlled Crane or the Like, such application being filed March 16, 1938, and the crane chosen for illustration may be of the same type as that shown in the copending application. The additional remote controls may be pressure regulating air valves or hydraulic valves, pressure regulating air valves having been chosen for illustration. These valves control the pressure operated means for the different portions of the crane, though it is not believed necessary to detail each of these constructions in this application. For example as shown in Figure 13, the left drum clutch has been shown. The means for operating this clutch may comprise the pneumatic cylinder 72 whose piston rod 73 operates the lever 74 for controlling the clutch, the clutch being preferably spring opened by means of the spring 75, so that when pressure is applied to the cylinder, the clutch is applied and when released from the cylinder the clutch is released. The clutches may be of the conventional construction and are indicated generally at 76 for the left drum clutch, see Figures 13 and 10, and at 77 for the right drum clutch, see Figure 10, the right drum clutch being similar to the left drum clutch illustrated in Figure 13.

The usual construction of the continuously rotating shaft 78 provided with a spider 79 and with spring pressed friction shoes 80 may be employed. The details of the construction, however, of the crane or other load handling means may be varied and only so much of it as is necessary for an understanding of this invention has been disclosed. For instance as shown in Figure 10, the crane may comprise the engine or power means 81 which, through gearing, drives the shaft 82 and the shaft 78. Left and right reversing clutches 83 and 84 are provided for respectively connecting the gears 85 and 86 to the continuously rotating shaft 82. These clutches are controlled by the pneumatic members 87 and 88, see Figure 10. Other pneumatic members are employed in controlling the various functions of the apparatus. One other one, for instance the engine clutch pneumatic control member, is indicated by the reference character 89 in Figure 10. All of the pneumatic members, in the form chosen for illustration, are operated by compressed air furnished by a compressor 90 driven by the engine and supplying a pressure storage tank 91, see Figure 10. For the sage of simplicity, however, only a few of the control means have been illustrated as they are well known types of devices.

Each of the pneumatic means is controlled by a pressure regulating valve in the main cab which is in turn controlled by either the controls in the main cab hereinafter described or the controls in the vertically adjustable cab 17. For example, the pneumatic member 72 for the left drum is controlled by the valve 94, see Figure 11, and this valve 94 is controlled by the hand lever 93 in the main cab. Similarly the pneumatic member for the right drum clutch, not shown, is controlled by the valve 92 which in turn is controlled by the hand lever 95 in the main cab.

The pneumatic members 87 and 88 control the main reversing clutches 83 and 84 as described, which clutches control the swing, the travel, or the boom hoist in accordance with the usual practice and as described in the copending application. The pneumatic members 87 and 88 are in turn controlled by the double valve 96 which double valve is in turn controlled by either of the levers 97 or 98, each of the levers being provided with upper ends, as shown in Figures 11 and 12, which operate one or the other of the parts of the double valve 96 depending on which way the levers are rocked. The lever 97 is controlled by the rod 99 and the lever 98 is controlled by the rod 100. The rod 99 extends to the control lever 101, see Figures 11 and 12, which control lever is located in the main cab, and motion of the lever from neutral position causes one or the other of the main clutches 83 or 84 to engage. Similarly motion of the rod 100, which is controlled from the remote cab 17 in a manner hereinafter described causes one or the other of the main clutches 83 or 84 to engage. The rod 100 extends to the lever 102, see Figure 12, which has two pivot points connected to the rods 103 and 104. The spacing of the pivot points is equal on both sides of the pivot 21.

The rods 103 and 104 extend upwardly to the cab 17, see Figure 4, and are connected at exactly similarly spaced points to the lever 105. The lever 105 in turn is connected by means of the link 106 with the control lever 107 located in the remote cab. It is therefore apparent that either the lever 101, see Figures 11 and 12, or the lever 107, see Figure 4, may be employed to control the double valve 96 and consequently to control the main reversing clutches.

The parallelogram arrangement is maintained for the rods 103 and 104 and the levers 102 and 105, see Figures 4 and 12, so that the vertical adjustment of the cab 17 will not affect the control from the lever 107 as the levers 102 and 105 will always occupy parallel positions, as the line joining the points of attachment of the rods 103 and 104 with these levers will always be parallel irrespective of the vertical adjustment of the cab 17.

Control levers 108 and 109, see Figure 5, are provided in the remote cab 17 and correspond to the levers 93 and 95, see Figure 11. Rods 110 and 111 extend from the levers 108 and 109, see Figures 4 and 5. They are connected to small levers 112 carried by the pivot 23. The levers 112, one of which is shown in Figure 4, are distinct from each other and are connected to rods 113 and 114 which extend parallel to the arms 19 and downwardly to small levers 115 and 116, see Figures 11 and 12. The same parallelogram arrangement heretofore described is maintained for these levers.

The lever 115 is carried rigidly by a sleeve 117, see Figure 11, and a lever 118 is also rigid with the sleeve 117. The lever 118 controls the valve 94. The lever 116 may be extended, as shown in Figures 11 and 12, and controls the valve 92. In each instance the valves are provided with levers 119 which have pins operating in slots in connecting links, as shown in Figure 12. For example the link for the lever 118 is indicated at 120 and the link for the lever 116 is indicated at 121.

It is clear that when the control lever 108 or 109 is operated, that the corresponding valve 94 or 92 is correspondingly opened to admit air to the member controlled thereby, for example the left or right drum clutch. For instance, if the lever 109 is operated, the link 121, see Figure 12, is drawn to the right as viewed in such figure, and the valve 92 is opened. Other means are provided for controlling these valves. These means, namely, the levers 93 and 95 located in the cab of the main body and previously described, respectively control the valves 94 and 92. However, there is no interference in the operation of the remote control levers or the ones in the cab in the main body. As shown in Figure 12 for example, the levers 93 and 95 are connected by suitable links with the separate levers 119 for the two valves 92 and 94. One of the connections is shown in full in Figure 12. For example the lever 93 is connected by means of the link 122 with one of the levers 119, and the lever 95 which is fastened to the sleeve 95' is connected by means of the link 122' with one of the levers 119, see Figures 11 and 12. The links 120, 121, 122 and 122' have pin and slot connections with the levers 119 so that either link of a given pair may be operated without moving the other link of that pair.

Although mechanical means have been shown for the levers 107, 108 and 109 in the cab 17, it is nevertheless to be distinctly understood that the respective air operated means may be controlled through the medium of flexible hose connected to air or hydraulic valves in the auxiliary cab.

Other control means are provided in the auxiliary cab and in the main cab. For instance in the auxiliary cab, three-way valves 123, 124 and 125 and a four-way valve 126 are provided and are connected in parallel with similar valves 123', 124', 125' and 126' in the cab of the main body, see Figures 6 and 11, by means of flexible hose not shown. The group of valves 123, 124 and 125, 123', 124' and 125' may control the steering lock of one of the crawlers, the engine clutch, and the boom hoist sliding gear. The valves 126 and 126' may control the shift gear for the swing or travel position or for the neutral position. This construction is shown in detail in the above noted copending application. One of the pneumatic means, namely, the pneumatic means 89, see Figure 10, has been shown for controlling the engine clutch and this pneumatic means is controlled from either the valve 124 or 124'. The flexible hose connection for the valves in the cab 17 and the pipe connection for the valves in the main body has not been shown as it is merely the conventional form.

In the third form of the invention as shown in Figures 7, 8 and 9, the control cab 127 is pivoted directly to the boom by means of the pivot pin 128 which extends through the body of the cab adjacent the lower portion thereof and through brackets 129 carried by the boom 130, so that the cab is always attached to the boom and is raised and lowered as the boom is raised and lowered.

However, means are provided for keeping the control cab 127 vertical in all positions of adjustment of the boom. This means may comprise the link 131, see Figures 7 and 8, and it is to be noted that the distance between the pivot 128 and the pivot point 132 is equal to the distance between the pivot 133 for the boom and the pivot 134 for the lower end of the link 131. The lines joining these center points are parallel and inasmuch as the rod 131 parallels the line joining the pivot points 128 and 133, it is clear that a parallelogram construction has been provided whereby the vertical position of the cab 127 is maintained for all adjustments of the cab. If desired, the cab may have a bracing structure, as indicated by the reference character 135, see Figures 7 and 8, leading to the pivot point 132. The control cab has the same controls therein as previously described and rods, all of which are not shown, extend from the controls downwardly to the main body portion and operate in exactly the same manner as previously described. Only the brake rods 136 have been shown for the sake of clearness in Figure 7.

Instead of having the intermediate portion of the rods supported as previously described, a swinging rack indicated generally at 137 in Figures 7 and 9 may be provided. This swinging rack consists of a series of links having rollers between them as indicated at 138 and joined at their outer ends. Their inner ends are pivoted on a rod 139 which extends through brackets 140 secured to the boom 130. A few of the rollers and a few of the control rods are shown in Figure 9. All of the rods, however, are not shown as certain of the rods have been omitted from Figures 7 and 9 and all of the rods have been omitted from Figure 8 for the sake of clearness.

The operation of the controls and of the brake pedals is identically the same as that previously described and the arrangement of levers and rods is such that a parallelogram construction is obtained. The rocking frame 137 is connected by means of a link 141 with a pivot 142 on the main frame. This construction also forms a parallelogram arrangement. The main body of the crane is indicated by the reference character 143 in Figure 7.

The difference between the two forms of the invention last described are that in the first of these two forms, the cab is elevated when the boom is raised by the power means and when the cab is connected to the boom. After the cab has arrived at its desired height in this form of the invention, it may be detached from the boom and may remain in its adjusted position irrespective of the raising or lowering of the boom. In the last described form of the invention the cab is raised and lowered simultaneously with the boom as it is always connected to the boom.

In both of these forms of the invention the cab is maintained vertical irrespective of changes in the height at which the cab is held.

It is to be understood that any suitable means may be employed for guiding the rods that form the parallelogram construction. For example, the second described form of the invention may have the rods guided as in the last form or the rods in the last form of the invention may be guided in the manner described for the second form of the invention. Obviously these guides may be dispensed with if a relatively short span or length of the rods is all that is needed, depending on the design of the crane or other load handling device.

In the last described form of the invention in place of the mechanical connection furnished by the rods for certain of the controls in the cab, these connections, as has been described for the second form of the invention, may be by means of flexible pneumatic or hydraulic hose. In the last form of the invention, the pneumatic valves have not been illustrated but they are of the same construction and operate in the same manner as that described for the second form of the invention.

It will be seen that this invention discloses novel load handling means in which elevated cabs are provided and in which dual controls one in the body of the device and one in the control cab are furnished, it being understood that in the form of the invention shown in Figure 1, dual controls may also be provided, as has been described in detail for other forms of the invention.

It will be seen further that the elevated cab will position the operator at a point where he has a clear and unobstructed view of the work and enables him to see the position of the load handling means and thus enables him to control it without assistance of an additional operator.

Further than this, it is to be noted that the standard type of controls can be employed and that these controls may be operated from the elevated cab. Obviously, as described hereinbefore, if it is found desirable at any time to operate the cab from the main body, such may readily be done as the controls are duplicated. The construction is such that with the vertically adjustable control cabs and where mechanical connections have been employed, these mechanical operative connections between the control means in the vertically adjustable cab and the corresponding portions of the mechanism in the main body are not interfered with by the raising or lowering of the cab.

It is to be understood that the elevated cab has controls in it which control the various parts of the mechanism through any intermediate means, that is to say, through mechanical means which controls the brakes for instance directly, or through mechanical means which control the pneumatic or hydraulic valves in the body portion or by pneumatic or hydraulic controls located in the control cab itself, the invention in its broadest aspect contemplating the use of controls in the control cab which control any type of mechanism in the main body, although in certain forms of the invention the control cab may be vertically adjustable to different heights without in any way interfering with the control of the mechanism from the control cab.

It is to be distinctly understood that where the expression "cab" appears in the description or in the claims, that this expression is not to be interpreted in a limiting sense as meaning merely the conventional form of cab as it is intended to cover any type of operator's station, whether merely a seat or an open cab or an enclosed cab, or any other type of construction which constitutes, as stated, a station for the remote operator, provided this station has, as stated, means for carrying the operator and means for holding the controls within ready access of the operator.

The expression "load handling device" is intended to cover cranes, shovels, draglines, trenchoes, or similar machines.

Although this invention has been described in considerable detail, it is to be understood that such description is intended as illustrative rather than limiting, as the invention may be variously embodied and is to be interpreted as claimed.

I claim:

1. A load handling device comprising a main body, a boom projecting therefrom, load handling means connected to said boom, power means carried by said main body for operating said load handling means and for raising said boom during load handling operations, a vertically adjustable control cab, control means located in said cab for controlling said load handling means, means for raising and lowering said cab, and means for holding said cab in any adjusted position independently of said boom, whereby said boom may be raised or lowered independently of said cab.

2. A load handling device comprising a main body, a boom projecting therefrom, load handling means connected to said boom, power means carried by said main body for operating said load handling means and for raising said boom, a vertically adjustable control cab, control means located in said cab for controlling said load handling means, means for raising and lowering said cab, means for holding said cab in any adjusted position independently of said boom, whereby said boom may be raised or lowered independently of said cab, and means for detachably and temporarily connecting said cab to said boom for moving said cab to a different height.

3. A load handling device comprising a main body, a boom projecting therefrom, load handling means connected to said boom, power means carried by said main body for operating said load handling means and for raising said boom, a vertically adjustable control cab, means for detachably connecting said cab and said boom for moving said cab to different heights by said boom, and releasable means for holding said cab at any selected height independently of said boom.

4. A load handling device comprising a main body, a boom projecting therefrom, load handling means connected with said boom, power means carried by said main body for operating said load handling means and for raising said boom, a control cab supported from said main body, means operated by said power means for raising said cab, and means operatively connected to said main body for locking said cab in any adjusted position independently of the means for raising said cab.

5. A load handling device comprising a main body, a boom projecting therefrom, load handling means connected with said boom, a vertically adjustable control cab, power means carried by said main body for operating said load handling means and for raising said boom, means for moving said control cab to different heights, means for holding the cab at different heights independently of said boom, and means for causing said control cab to swing in a horizontal plane synchronously with said boom.

6. A load handling device comprising a main body, a boom projecting therefrom, load handling means connected with said boom, a vertically adjustable control cab, power means for operating said load handling means and for raising said boom, and means for connecting and disconnecting said cab and said boom.

7. A load handling device comprising a main body, a boom projecting therefrom, load handling means connected with said boom, a vertically adjustable control cab, power means for operating said load handling means and for raising said boom, locking cable means for locking said cab in adjusted position, and means independent of said locking cable means for raising and lowering said cab.

8. A load handling device comprising a main body, a boom projecting therefrom, load handling means connected with said boom, a vertically adjustable control cab, and power means for operating said load handling means and for raising said boom, said cab being pivotally supported from said boom, and means paralleling said boom for keeping said cab in an upright position when said boom is adjusted to different angular positions.

9. A load handling device comprising a main body, a boom projecting therefrom, load handling means connected with said boom, a vertically adjustable control cab, power means for operating said load handling means, means for vertically adjusting said control cab, brake means for said load handling means, control means including brake operating means in said control cab, and mechanism mechanically and operatively connecting said brake means and said brake operating means for operating said brake means directly and mechanically from said brake operating means irrespective of different vertical adjustments of said control cab.

10. A load handling device comprising a main body, a boom projecting therefrom, load handling means connected with said boom, a vertically adjustable control cab, power means for operating said load handling means and for vertically adjusting said control cab, brake means for said load handling means, control means including brake operating means in said control cab, and mechanism mechanically and operatively connecting said brake means and said brake operating means for operating said brake means directly and mechanically from said brake operating means irrespective of different vertical adjustments of said control cab.

11. A load handling device comprising a main body, load handling means, a vertically adjustable control cab, power means for operating said load handling means and for raising said control cab, brake means for said load handling means, control means including brake operating means in said control cab, and mechanism mechanically and operatively connecting said brake means and said brake operating means for operating said brake means directly and mechanically from said brake operating means irrespective of different vertical adjustments of said control cab.

12. A load handling device comprising a main body, a boom projecting therefrom, load handling means connected with said boom, a vertically adjustable control cab, power means for operating said load handling means and for raising said control cab, means for maintaining said control cab vertical irrespective of different heights to which said cab is adjusted, brake means for said load handling means, control means within said control cab for controlling said load handling means including brake operating means for mechanically operating said brake means, and mechanism directly and mechanically connecting said brake operating means and said brake means, said mechanism forming a parallelogram with the means for maintaining said control cab vertical irrespective of different heights to which said control cab is moved.

13. A load handling device comprising a main body, a vertically adjustable control cab supported from said main body, load handling means, power means in said main body for operating said load handling means and for raising said control cab, control mechanism including controls in said control cab for controlling said load handling means from said control cab irrespective of the adjustment of said control cab to different heights, control means in said main body for controlling said load handling means, and mechanical means connecting the control means in said cab to the control means in said main body.

14. A load handling device comprising a main body, a vertically adjustable control cab supported from said main body by parallel lever mechanism, load handling means, power means for operating said load handling means, means for raising said cab, mechanism in said main body for controlling said load handling means, control means in said control cab, and intermediate means for mechanically and directly connecting said control means in said control cab with the said mechanism in said main body independently of the raising or lowering of said control cab.

15. A load handling device comprising a main body, a vertically adjustable control cab supported from said main body, load handling means, power means in said main body for operating said load handling means and for raising said control cab, control means in said main body for controlling said load handling means, and control means in said vertically adjustable cab for controlling said load handling means, whereby said load handling means may be controlled either from said main body or from said vertically adjustable control cab.

16. A load handling device comprising a main body, a vertically adjustable control cab supported from said main body, load handling means, power means in said main body for operating said load handling means and for raising said control cab, control means in said main body for controlling said load handling means, and control means in said vertically adjustable cab, each of said control means being operable without operating the other control means.

17. A load handling device comprising a main body, a boom projecting therefrom, load handling means connected to said boom, power means for operating said load handling means, a control cab located at an elevated point above said main body and supported from said main body, control means in said elevated cab for controlling said load handling means, and control means in said main body for controlling said load handling means, the control means in said main body duplicating the control means in the control cab, whereby an operator may selectively control the load handling means from the elevated control cab or from the main body.

EDWARD B. NICKLES.